United States Patent
Deguchi (10) Patent No.: US 7,107,234 B2
(45) Date of Patent: Sep. 12, 2006

(54) ELECTRONIC MUSIC MARKER DEVICE DELAYED NOTIFICATION

(75) Inventor: Yuichiro Deguchi, San Mateo, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 620 days.

(21) Appl. No.: 09/932,665

(22) Filed: Aug. 17, 2001

(65) Prior Publication Data

US 2003/0036967 A1    Feb. 20, 2003

(51) Int. Cl.
*G06Q 30/00* (2006.01)

(52) U.S. Cl. ............................................. 705/26

(58) Field of Classification Search .................. 705/26, 705/27
See application file for complete search history.

(56) References Cited

U.S. PATENT DOCUMENTS

| | | | |
|---|---|---|---|
| 3,836,842 A | 9/1974 | Zimmermann et al. | |
| 5,199,009 A | 3/1993 | Svast | |
| 5,297,118 A | 3/1994 | Sakumoto | |
| 5,508,978 A | 4/1996 | Kalbermatter et al. | |
| 5,579,472 A | 11/1996 | Keyworth, II et al. | |
| 5,758,257 A | 5/1998 | Herz et al. | |
| 5,850,218 A | 12/1998 | LaJoie et al. | |
| 5,889,737 A | 3/1999 | Alameh et al. | |
| 5,915,288 A | 6/1999 | Gabriel | |
| 6,088,021 A | 7/2000 | Yong | |
| 6,100,884 A | 8/2000 | Tomita et al. | |
| 6,104,334 A | 8/2000 | Allport | |
| 6,128,009 A | 10/2000 | Ohkura et al. | |
| 6,144,864 A | 11/2000 | Lands et al. | |
| 6,148,261 A | 11/2000 | Obradovich et al. | |
| 6,158,884 A | 12/2000 | Lebby et al. | |
| 6,169,498 B1 | 1/2001 | King et al. | |
| 6,199,125 B1 | 3/2001 | Cortesi | |
| 6,216,230 B1 | 4/2001 | Rallis et al. | |
| 6,243,691 B1 * | 6/2001 | Fisher et al. | .................. 705/37 |
| 6,263,438 B1 | 7/2001 | Walker et al. | |
| 6,272,545 B1 | 8/2001 | Flanagin et al. | |

(Continued)

FOREIGN PATENT DOCUMENTS

EP    0 858 171 A2 * 12/1998

OTHER PUBLICATIONS

Jeff Tyson, "How the Old Napster Worked".*

*Primary Examiner*—Yogesh C. Garg
*Assistant Examiner*—Naeem Haq
(74) *Attorney, Agent, or Firm*—John P. O'Banion; Richard H. Butler (57) ABSTRACT

Method and system for providing a notification function for bookmarked music clips broadcast over a radio station to provide to a user of an electronic music marking device such that when the playlist for the bookmarked music clips is available, the user can access information corresponding to the bookmarked music clips, while when the playlist for the bookmarked music clips is not available, the user is notified that the playlist is unavailable, and when the playlist becomes available, the an email is generated and transmitted to the user informing the user that the playlist corresponding to the user's bookmarked music clips is available, and further, the email may include a hypertext link attachment which may be configured to automatically re-direct the user's browser terminal to display the playlist corresponding to the bookmarked music clips on the user's electronic music marker device account.

26 Claims, 9 Drawing Sheets

U.S. PATENT DOCUMENTS

| | | |
|---|---|---|
| 6,289,346 B1 | 9/2001 | Milewski et al. |
| 6,290,517 B1 | 9/2001 | Anderson |
| 6,304,249 B1 | 10/2001 | Derocher et al. |
| 6,323,783 B1 | 11/2001 | Lizzi |
| 6,330,490 B1 | 12/2001 | Kim et al. |
| 6,353,398 B1 | 3/2002 | Amin et al. |
| 6,356,971 B1 | 3/2002 | Katz et al. |
| 6,360,209 B1 | 3/2002 | Loeb et al. |
| 6,392,635 B1 | 5/2002 | Snyder |
| 6,425,081 B1 | 7/2002 | Iwamura |
| 6,427,175 B1 | 7/2002 | Khan et al. |
| 6,493,702 B1 | 12/2002 | Adara et al. |
| 6,507,727 B1 | 1/2003 | Henrick |
| 6,515,595 B1 | 2/2003 | Obradovich et al. |
| 6,556,513 B1 | 4/2003 | Wimberly |
| 6,559,773 B1 | 5/2003 | Berry |
| 6,571,577 B1 | 6/2003 | Radley-Smith |
| 6,578,047 B1 | 6/2003 | Deguchi |
| 6,637,028 B1 | 10/2003 | Voyticky et al. |
| 6,650,534 B1 | 11/2003 | Tree |
| 6,650,877 B1 | 11/2003 | Tarbouriech et al. |
| 6,674,993 B1 | 1/2004 | Tarbouriech |
| 6,680,714 B1 | 1/2004 | Wilmore |
| 6,763,371 B1 | 7/2004 | Jandel |
| 2001/0019618 A1 | 9/2001 | Rhoads |
| 2001/0020239 A1 | 9/2001 | Ukigawa |
| 2001/0034219 A1 | 10/2001 | Hewitt et al. |
| 2001/0040977 A1 | 11/2001 | Nakano |
| 2001/0051996 A1 | 12/2001 | Cooper et al. |
| 2002/0007354 A1 | 1/2002 | Deguchi |
| 2002/0023272 A1 | 2/2002 | Pocock |
| 2002/0032019 A1 | 3/2002 | Marks et al. |
| 2002/0032698 A1 | 3/2002 | Cox |
| 2002/0056084 A1 | 5/2002 | Harris et al. |
| 2002/0068991 A1 | 6/2002 | Fitsimmons |
| 2002/0120577 A1 * | 8/2002 | Hans et al. ............... 705/59 |
| 2002/0120650 A1 | 8/2002 | Walker et al. |
| 2002/0162009 A1 | 10/2002 | Shmueli et al. |
| 2002/0164973 A1 | 11/2002 | Janik et al. |
| 2002/0174372 A1 | 11/2002 | Venkataraman |
| 2002/0174431 A1 | 11/2002 | Bowman |
| 2002/0186886 A1 | 12/2002 | Rhoads |
| 2003/0005433 A1 | 1/2003 | Janik et al. |
| 2003/0012403 A1 | 1/2003 | Rhoads et al. |
| 2003/0023421 A1 | 1/2003 | Finn et al. |
| 2003/0027634 A1 | 2/2003 | Matthews, III |
| 2003/0097351 A1 | 5/2003 | Rothschild et al. |
| 2003/0103645 A1 | 6/2003 | Leza |
| 2003/0174167 A1 | 9/2003 | Poo et al. |
| 2003/0217206 A1 | 11/2003 | Poo |
| 2004/0171377 A1 | 9/2004 | Engstrom |
| 2004/0203729 A1 | 10/2004 | Makipaa et al. |

\* cited by examiner

| Device ID: K01-U23-N45-I67 | | |
|---|---|---|
| Bookmark | Date | Time |
| Bookmark #1 | 1/21/01 | 13:46 |
| Bookmark #2 | 1/21/01 | 13:51 |
| Bookmark #3 | 1/21/01 | 14:07 |
| Bookmark #4 | 1/21/01 | 19:41 |
| Bookmark #5 | 1/21/01 | 21:45 |
| Bookmark #6 | 1/21/01 | 22:01 |

| User Name | Marker ID | User Account Name | Location ID | Feed Type |
|---|---|---|---|---|
| John First | A11-K21-K43-F23 | FirstJ | San Francisco | 10 Minute |
| Matt Sawyer | K01-U23-N45-I67 | Msawyer | Atlanta, GA | 10 Minute |
| Steve Santisi | B32-F32-V67-J88 | Tznet | Boston, MA | 10 Minute |
| Helen Owen | B33-D23-D45-K12 | Howen | Maui, HI | Next Day |
| Jack Green | B32-F32V67-J88 | JGG | Vail, CO | Next Day |

FIG. 6

| Bookmark | Title | Artist | Album | Station Call Letter |
|---|---|---|---|---|
| 1 | Fade to Black | Metallica | Ride the Lightning | KROK |
| 2 | Creeping Death | Metallica | Ride the Lightning | KROK |
| 3 | Aces High | Iron Maiden | Powerslave | KCGO |
| 4 | Trapped Under Ice | Metallica | Ride the Lightning | KCGO |
| 5 | For Whom the Bell Tolls | Metallica | Ride the Lightning | KROK |
| 6 | Run to the Hills | Iron Maiden | Powerslave | KROK |

FIG. 7

| Broadcast Time (GMT) | Title | Artist | Album |
|---|---|---|---|
| 13:28 | The Duelist | Iron Maiden | Powerslave |
| 13:33 | Remember Tomorrow | Iron Maiden | Powerslave |
| 13:39 | Fight Fire with Fire | Metallica | Ride the Lightning |
| 13:45 | Fade to Black | Metallica | Ride the Lightning |
| 13:52 | Creeping Death | Metallica | Ride the Lightning |
| 13:56 | Aces High | Iron Maiden | Powerslave |

FIG. 8

| Broadcast Time (GMT) | Title | Artist | Album |
|---|---|---|---|
| 13:36 | Fade to Black | Metallica | Ride the Lightning |
| 13:41 | For Whom the Bell Tolls | Metallica | Ride the Lightning |
| 13:47 | Escape | Metallica | Ride the Lightning |
| 13:53 | Minutes to Midnight | Iron Maiden | Powerslave |
| 14:02 | Aces High | Iron Maiden | Powerslave |
| 14:09 | Flash of the Blade | Iron Maiden | Powerslave |

ELECTRONIC MUSIC MARKER DEVICE DELAYED NOTIFICATION

FIELD OF THE INVENTION

The present invention relates to electronic music marker devices. More particularly, the present invention relates to delayed notification function for electronic music marker devices.

BACKGROUND OF THE INVENTION

Sony Corporation and its U.S. subsidiary, Sony Electronics, Inc., introduced an electronic music marker device which is capable of "bookmarking" a music clip while being played on a radio and, which, when synchronized with a gateway device such as a personal computer for connection to a server terminal for e-marker.com web site, for example, is capable of recalling information related to the bookmarked music clip such as the name of the song, the artist, the album containing the song and so on. Using the electronic music marker device, a user can conveniently recall the music clip information that the user listened to on the radio at a later time without the need to memorize the information or wait hopefully for the disc jockey on the radio to provide that information. In this manner, if the user wants to, for example, purchase the music album which the user has marked using the electronic music marker device, the user can easily identify the necessary information related to the marked music clip from the e-marks provided by the electronic music marker device.

When the electronic music marker device is connected to the gateway device to retrieve information related to the bookmarked music clips, in some cases, the desired information related to the bookmarked music clips may not be readily available. In some instances, the user of the electronic music marker device may receive a message indicating that the requested information is not available, and to request the information again at a later time, for example, by connecting the electronic music marker device to the gateway device again for connection to the server terminal.

SUMMARY OF THE INVENTION

In view of the foregoing, a data marking device notification system includes a gateway terminal configured to receive one or more data marks, a playlist provider configured to generate a playlist, and a server terminal coupled to the gateway terminal configured to receive the data marks from the gateway terminal, the server terminal further configured to receive the playlist from the playlist provider and to generate a user playlist based on the data marks and the received playlist.

A delayed data mark playlist notification system of another embodiment includes a gateway terminal connected to a data marking device, the gateway terminal configured to receive data marks from the data marking device, each data mark including a time stamp and a date stamp corresponding to a music clip broadcast over a registered radio station, and a server terminal coupled to the gateway terminal configured to receive data marks, and accordingly, to generate a corresponding user playlist, the user playlist including one or more of a name of the broadcast music clip, a name of the music clip artist, and the name of the music clip album, the server terminal further configured to transmit the generated user playlist to the gateway terminal.

A method of a further aspect includes receiving data marks, searching for playlists corresponding to the received data marks, generating a message, transmitting the message to a user.

A data marking device notification system of yet another embodiment includes means for receiving data marks, means for generating a playlist, and means for receiving the playlist and generating a user playlist based on the data marks and the received playlist.

A delayed data mark playlist notification system of still another embodiment includes means for receiving data marks, each of data mark including a time stamp and a date stamp corresponding to a music clip broadcast over a registered radio station, and means for generating a user playlist, the user playlist including one or more of a name of the broadcast music clip, a name of the music clip artist, and the name of the music clip album.

DETAILED DESCRIPTION

Figure 1:
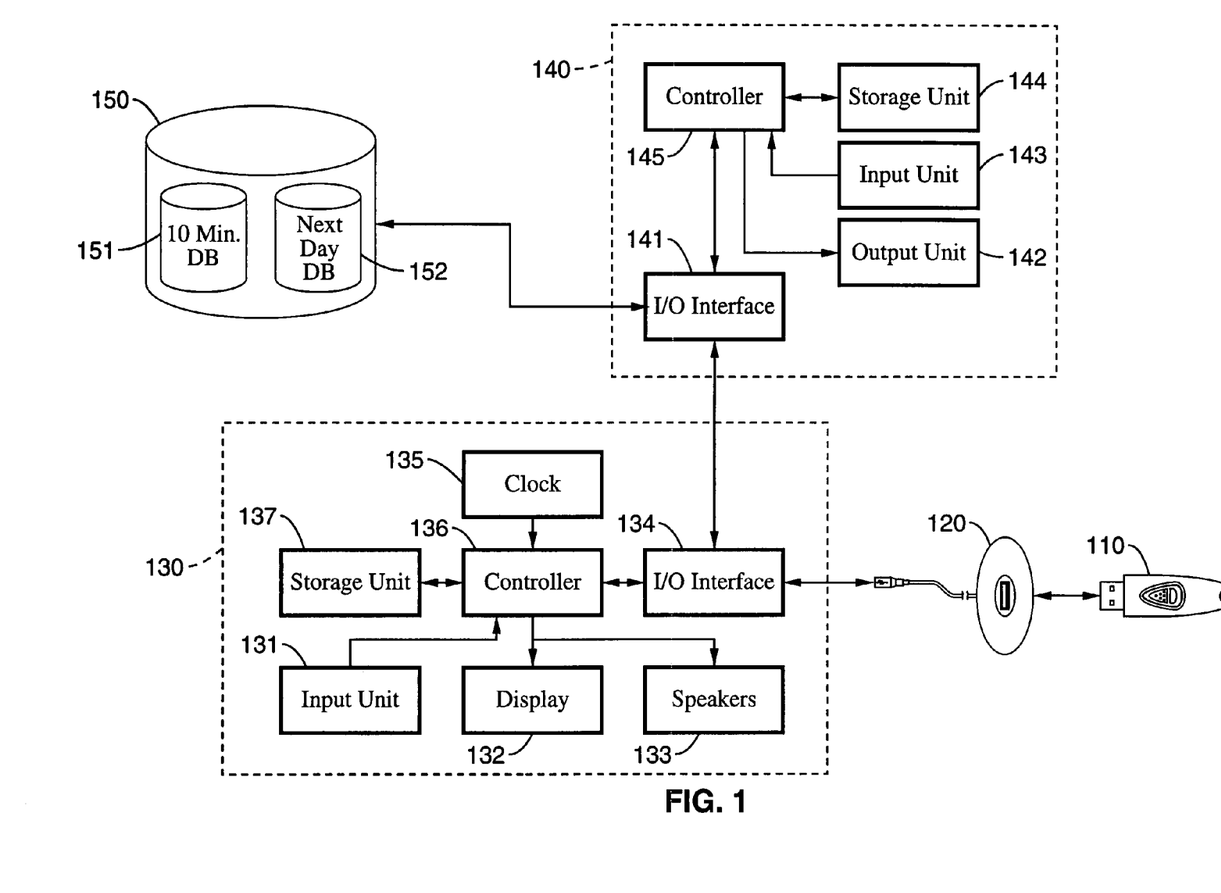
FIG. 1 illustrates one embodiment of an electronic music marker device playlist notification system.

FIG. 1 illustrates one embodiment of an electronic music marker device playlist notification system. Referring to FIG. 1, electronic music marker device playlist notification system 100 includes electronic music marker device 110, cradle-type docking connection 120, gateway terminal 130 connected to docking connection 120, server terminal 140 and playlist provider 150. In one aspect, music marker device 110 may be configured to couple to docking connection 120 for transferring data from music marker device 110 to gateway terminal 130 for communication to server terminal 140.

Gateway terminal 130 in one embodiment includes input unit 131, output sections such as display unit 132 and speakers 133 for outputting text, image, or video data as well as audio data, respectively, input/output (I/O) interface unit 134, clock unit 135, controller 136, and storage unit 137. Storage unit 137 of gateway terminal 130 may include one or more of an internal or an external storage device such as a hard disc drive (HDD), a CD-RW drive, or a zip drive. Input unit 131 of gateway terminal 130 may include one of or a combination of a keyboard, a mouse, a touchpad input device and a voice-recognition type input terminal including a microphone with corresponding software installed in gateway terminal 130 for performing input operations by voice commands. Alternatively, input unit 131 may include a touchpad-type screen integrated with display unit 132 for simultaneously inputting and displaying information, where the user can tap the pressure-sensitive screen using a stylus or the like to enter input commands.

Display unit 132 of gateway terminal 130 may be configured to output text, image (for example, in .jpg or .gif formats) or video data (for example, in .avi or .mpeg formats), while speakers 133 may be configured to output sound data in the form of, for example, .wav file format. In one embodiment, Display unit 132 may include one of a liquid crystal display (LCD), a plasma-type display, and the like, configured to display text, image and video data, or a combined text, image, and video data. In this manner, gateway terminal 130 in one embodiment may be configured to communicate with server terminal 140 over an internet connection to for data transfer including receiving playlists and transmitting bookmarks as discussed in further detail below.

Controller 136 of gateway terminal 130 may be coupled to input unit 131 and accordingly, may be configured to process the input data received from input unit 131. Storage unit 137 is similarly coupled to controller 136, and may be configured to store inputted data received from input unit 131 or other data received by gateway terminal 130. Clock 135 also coupled to controller 136 may be configured to provide time information to controller 136 which, in turn, may be stored in storage unit 137 for further processing.

Referring back to FIG. 1, I/O interface unit 134 in one embodiment may be coupled to controller 136, and may be configured to communicate with server terminal 140 and with music marker device 110 via cradle type docking connection 120. In one embodiment, I/O interface circuit 134 of user terminal 130 may include a communication port configured to connect to the server terminal 140 via the internet 120 through connections such as, but not limited to, a modem dial-up through an internet service provider (ISP), a DSL or cable modem-type connection, and a T1, IDSN or LAN type connection. To this end, a communication port may be integrated in I/O interface circuit 134, which may include, among others, one of a USB port, a serial port, a parallel port, an IEEE 1394 communication port, a IrDA communication port, and a Bluetooth enabled communication port.

While shown as a computer terminal, within the scope of the present invention, gateway terminal 130 may include a personal computer, an internet access enabled personal digital assistant, a WAP-enabled mobile telephone, an i-mode mobile telephone configured to operate under the i-mode protocol for wireless internet connection, or a television set enabled for web-TV internet access. Furthermore, while I/O interface unit 134 of gateway terminal 130 is shown as coupled to cradle-type docking connection 120 for communication with music marker device 110 which may include one of a cable-type hard wire connection using a USB port, IEEE 1394 port, a serial port, or a parallel port, alternatively, I/O interface unit 134 of gateway terminal 130 may be configured to communicate directly with music marker device 110 bypassing connection 120, through communication terminals such a wireless interface terminal including an IrDA port or a Bluetooth enabled port. In this case, music marker device 110 may be provided with a similar complimentary wireless interface communication port for communication with the gateway terminal 130.

Referring back to FIG. 1, server terminal 140 in one embodiment includes I/O interface unit 141, output unit 142, input unit 143, storage unit 144 and controller 145. In one embodiment, I/O interface unit 141 may be configured to communicate with gateway terminal 130 and playlist provider 150, while controller 145 coupled to I/O interface unit 141 may be configured to control the interface communication if I/O interface unit 141 with gateway terminal 130 and playlist provider 150. Moreover, controller 145 may be coupled to storage unit 144 to retrieve stored data as well as to store and update information received from gateway terminal 130 and playlist provider 150 in storage unit 144. Optionally, controller 145 may be coupled to input unit 143 and output unit 142 for controlling information received via input unit 143 and also for controlling the output display of information received from input unit 143, gateway terminal 130, and playlist provider 150.

In one aspect, storage unit 144 may include one or a plurality of databases for storing, among others, user account information such as user name, user address, user account name, user contact information and user billing information. Moreover, storage unit 144 of server terminal 140 may further be configured to include user a playlist database, a registered radio station playlists received from playlist provider 150, and server terminal configuration software and drivers for controlling and operating server terminal 140. In one aspect, server terminal software and the drivers stored in storage unit 144 may be embodied as a computer program developed using an object oriented language that allows the modeling of complex systems with modular objects to create abstractions that are representative of real world, physical objects and their interrelationships. However, it would be understood by one of ordinary skill in the art that the various embodiments as described herein may be implemented in many different ways using a wide range of programming techniques as well as general purpose hardware systems or dedicated controllers.

Referring again to FIG. 1, playlist provider 150 includes, among others, 10-minute database 151 and next day database 152 which are periodically accessed and updated by playlist provider 150. In one embodiment, playlist provider 150 may be configured to transmit to server terminal 140 information corresponding to a music broadcast from a registered radio station within 5 to 10 minutes from the actual broadcast, where the registered radio station is located within the coverage region of server terminal 140. In particular, upon the termination of broadcast of the music clip from the registered radio station, playlist provider 150 may be configured to query 10-minute database 151 to retrieve data corresponding to the broadcasted music clip, and to transmit the retrieved data to server terminal 140. In another aspect, playlist provider 150 may be configured to transmit to server terminal 140 information corresponding to a music broadcast from a registered radio station the following day subsequent to the actual broadcast.

In particular, for music broadcasts from registered radio stations prior to 10 PM, playlist provider 150 may be configured to transmit information corresponding to the broadcast music clips to server terminal 140 by 5 AM (at playlist provider 150) of the following day. Otherwise, for broadcasts after 10 PM, playlist provider 150 may be configured to transmit information corresponding to the broadcast music clips to server terminal 140 after 5 AM or within a predetermined time frame from the actual broadcast for example, within 24 hours from the actual broadcast, or within a predetermined lapsed time from a given set of broadcast times. For example, for music broadcast between 10 PM and 2 AM, playlist provider 150 may be configured to transmit data corresponding to the broadcast music clips by 12 PM (or within ten hours from the cutoff broadcast time of 2 AM), and for music broadcast between 2 AM and 5 AM, playlist provider 150 may be configured to transmit data corresponding to the broadcast music clips by 5 PM (or within 12 hours from the cutoff broadcast time of 5 AM).

Figure 2:
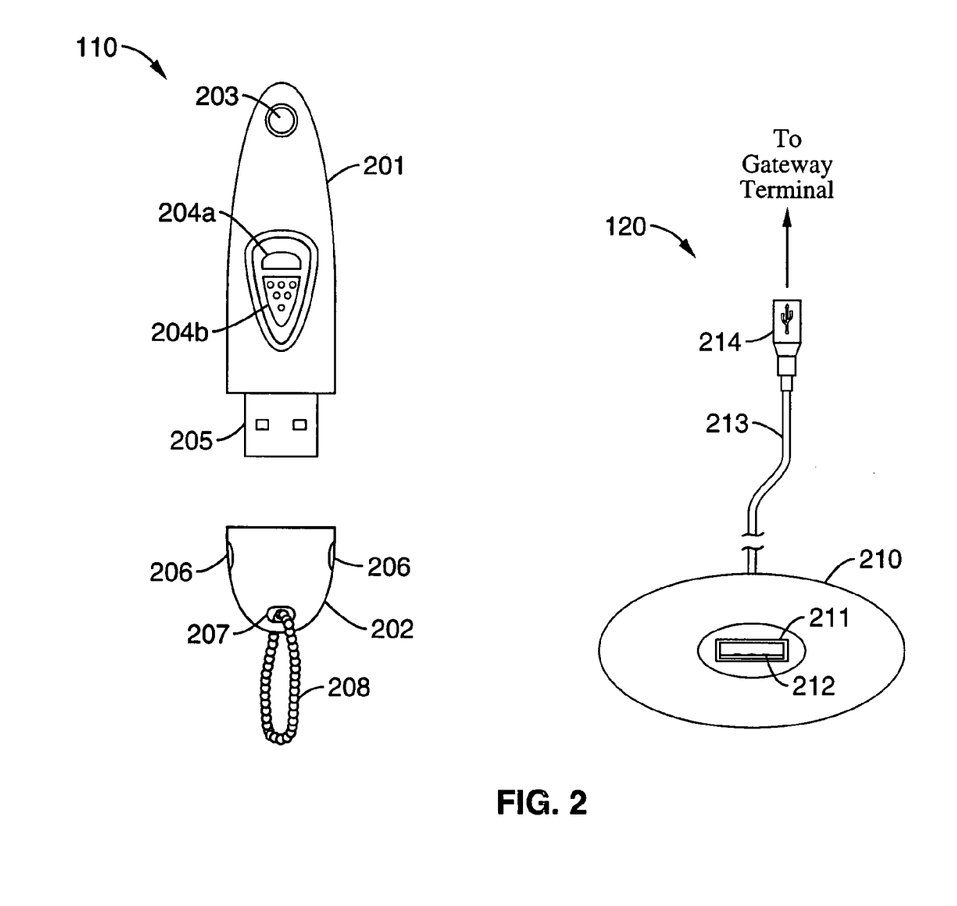
FIG. 2 illustrates an electronic music marker device.

FIG. 2 illustrates an electronic music marker device and cradle-type docking connection. Referring to FIG. 2, music marker device 110 includes a housing comprising body 201 and cap 202. Body 201 is provided with e-mark button 203 which is configured for user input commands. Also provided on body 201 are display panels 204a and 204b which are configured to display the number of user inputted e-marks and the type of registered broadcast station for the corresponding e-marks, respectively. Finally, body 201 includes communication port 205 such as a USB port which is integrated onto body 201 such that, as will be discussed in further detail below, body 201 may be placed on top of cradle type connection 120 with communication port 205 capable of being plugged into the corresponding port on cradle 120.

Cap 202 can be attached to body 201 when access to communication port 205 is unnecessary. As shown, cap 202 is provided with a pair of release/lock buttons 206 on either side of cap 202 such that by depressing release/lock buttons 206 when cap 202 is locked with body 201, cap 202 can be released from a locked position and communication port 205 may be accessed. Furthermore, cap 202 is provided with hole 207 substantially at its edge position such that link chain 208 can be looped through hole 207 to allow the user to attach the music marker device 110 to a key chain or the like.

Referring back to FIG. 2, cradle-type connection 120 is provided with cradle base 210 substantially flat on its bottom surface (not shown) to rest cradle 120 on a flat surface such as a desktop and a book shelf. On the other side of the bottom surface of cradle 120 is receiving section 211 substantially positioned on the middle of cradle 120, where communication port 212 such as a USB port is provided for connection to communication port 205 of the music marker device 110. Also shown in FIG. 2 is cable 213 attached to connection 120 with a communication port 214 at its other end. In this manner, cradle 120 may be connected to gateway terminal 130 accessing the user's electronic music marker device account over an internet connection.

Additional detailed information relating to the operation of the electronic music marker device 110 may be found in pending application Ser. No. 09/126,007 filed on Jul. 29, 1998 and application Ser. No. 09/401,105 filed on Sep. 22, 1999, both assigned to Sony Corporation, joint-assignee of the present application with Sony Electronics, Inc., a subsidiary of Sony Corporation, the disclosures of each of which are herein incorporated in their entirely by reference for all purposes.

Figure 3:
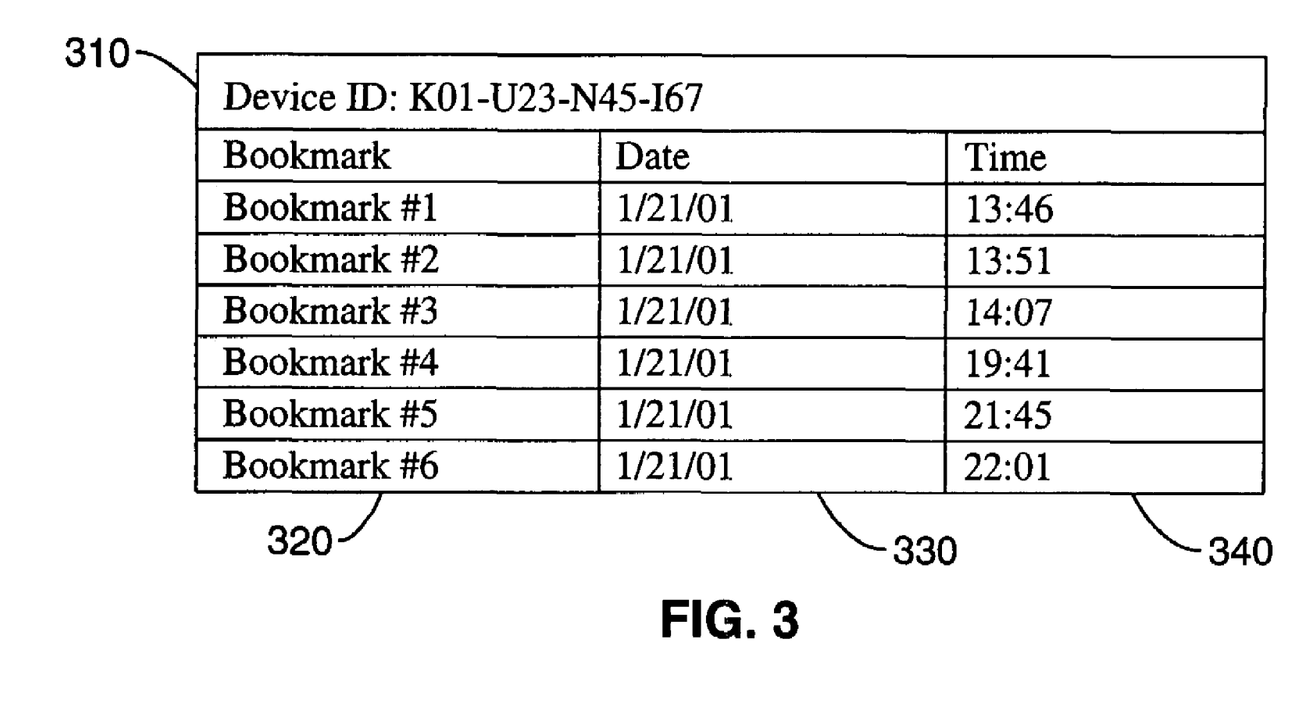
FIG. 3 is one embodiment of a database illustration of the bookmarks in storage unit of the electronic music marker device.

FIG. 3 is one embodiment of a database illustration of the bookmarks in a storage unit of the electronic music marker device. Referring to FIG. 3, storage unit such as a random access memory (RAM) and/or a read-only memory (ROM) may be configured to store device ID unique for each marker device 110 in device ID field 310. Additionally, storage unit of marker device 110 may also be configured to store bookmarks input by the user in bookmark field 320, with a corresponding date and time information (for example, a time stamp) for the respective bookmarks in date field 330 and time field 340, respectively. In this manner, when music marker device 110 is connected to server terminal 140 via gateway terminal 130, information stored in marker device storage unit such as the bookmarks and the corresponding date and time stamp information may be transmitted to server terminal 140.

Figure 4:
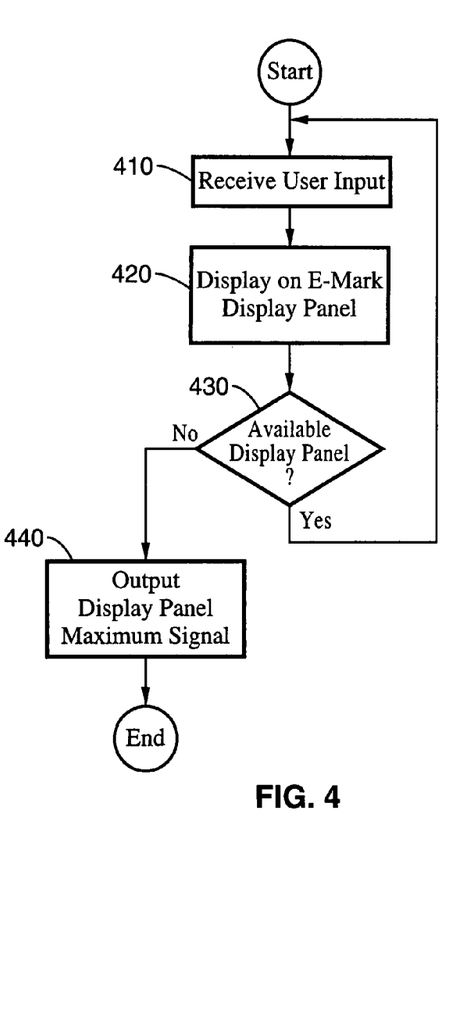
FIG. 4 is a flowchart for illustrating one embodiment of the electronic music marker device operation.

FIG. 4 is a flowchart for illustrating one embodiment of the electronic music marker device operation. Referring to FIG. 4, at step 410, electronic music marker device 110 detects user's input operation of e-mark button 203. Then, at step 420, music marker device 110 illuminates or flashes a corresponding e-mark display panel 204a, 204b. As discussed above, in one embodiment, the corresponding e-mark display panel 204a, 204b may be configured to display time and/or date information of the user's input operation of e-mark button 203.

At step 430, music marker device 110 determines whether all available e-mark display panels 204a, 204b are being used (for example, illuminated or flashing in response to user's input operation of e-mark button 203). If it is determined that there are e-mark display panels 204a, 204b available, music marker device 110 waits for further input operation by the user at step 410. On the other hand, if it is determined at step 430 that all available e-mark display panels 204a, 204b are in use, then at step 440, electronic music marker device 110 generates an output signal to inform the user that music marker device 110 has reached its maximum number of e-marks that it can handle, and the procedure ends. In one embodiment, the output signal from music marker device 110 to inform the user that it has reached its maximum number of e-marks it can handle may be an audible output signal such as an audible tone via an audio output terminal (not shown). Alternatively, music marker device 100 may be configured to flash all e-mark display panels 203 simultaneously for a predetermined period of time to visually indicate to the user that it has reached its maximum number of e-marks that it can handle.

Figure 5:
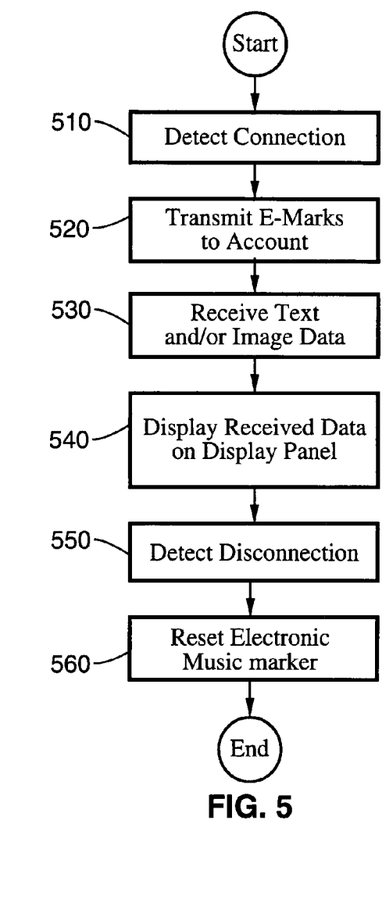
FIG. 5 is a flowchart for illustrating one embodiment of downloading data from the user's electronic music marker device account to the electronic music marker device.

FIG. 5 is a flowchart for illustrating one embodiment of downloading data from the user's electronic music marker device account to the music marker device. Referring to FIG. 5, at step 510, music marker device 110 detects a connection to gateway terminal 130 connected to the internet. After the user enters the user's account information and performing necessary electronic music marker device account access steps at gateway terminal 130, at step 520, data corresponding to the e-marks (bookmarks) stored in music marker device 110 is transmitted to the user's electronic music marker device account via gateway terminal 130, and in response, the corresponding text and/or image (including video) data are retrieved from server terminal 140 of e-marker.com web site and transmitted to the user's electronic music marker device account. Then, at step 530, the text and/or image data corresponding to each e-marks are downloaded onto music marker device 110. At step 540, the downloaded text and/or image data are displayed on each corresponding e-mark display panel 204a, 204b on music marker device 110.

When the user disconnects music marker device 110 from gateway terminal 130, the termination of the is detected at step 550, and at step 560, music marker device 110 is reset such that previously stored e-marks inputted by the user may be erased from the storage unit of music marker device 110, and correspondingly, the illuminated e-mark display panels 204a, 204b are turned off. The user may then operate e-mark button 203 again to input additional bookmarks of music clip broadcasts from registered radio and television broadcast stations.

Figure 6:
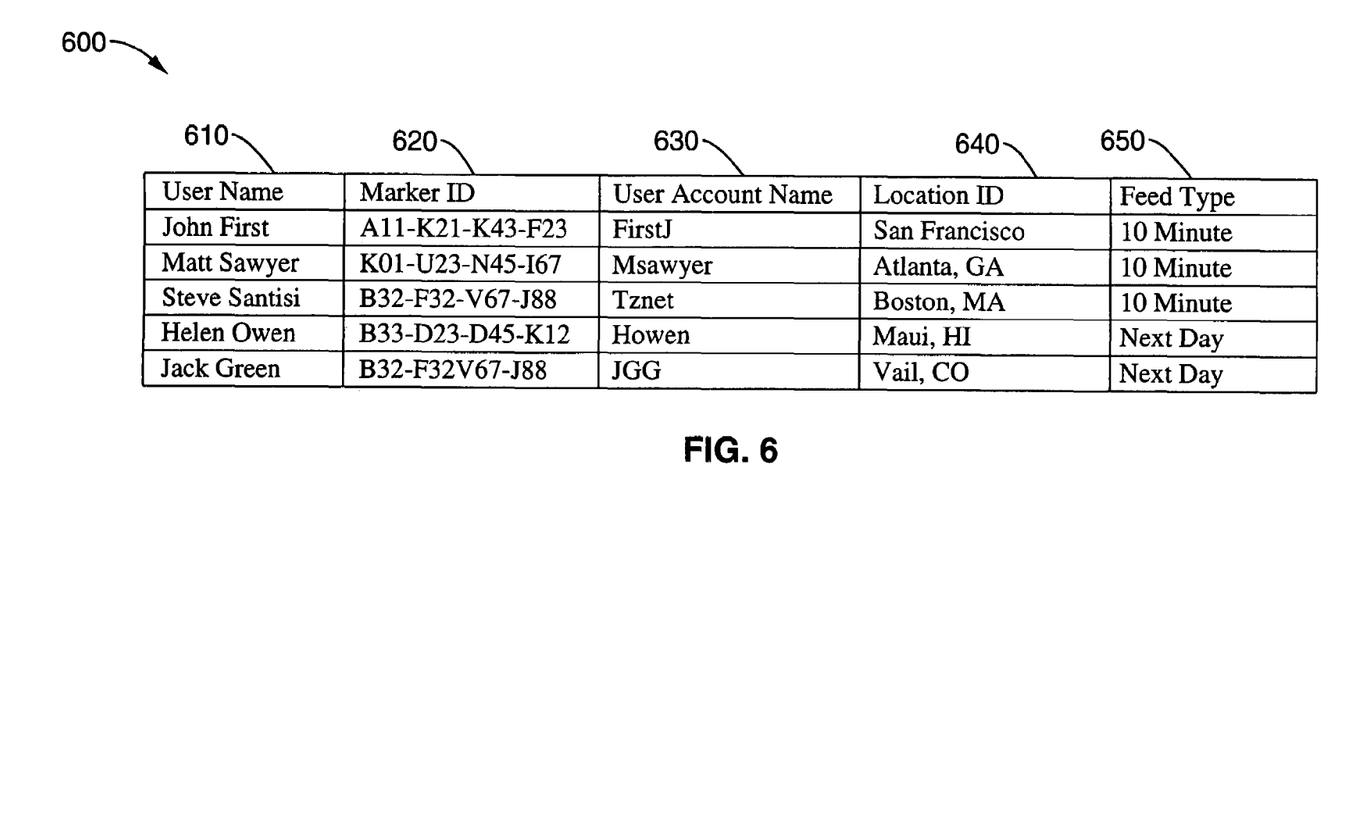
FIG. 6 is a database illustration of a user account stored in the storage unit of the server terminal in accordance with one embodiment.

FIG. 6 is a database illustration of a user account stored in the storage unit of the server terminal in accordance with one embodiment. Referring to FIG. 6, user account database 600 includes user name field 610, user marker ID field 620, user account name field 630, location ID field 640, and feed type field 650. As can be seen, user name field 610 is configured to store the name of each registered user of music marker device 110, while marker ID field 620 is configured to store the corresponding unique marker identification code for each registered user. Additionally, user account name field 630 is configured to store a corresponding user account name generated by server terminal 140 upon user registration process at e-marker.com web site, or alternatively, provided to server terminal 140 by the user via input unit 131 of gateway terminal 130 during registration process.

Referring back to FIG. 6, location ID field of user account database 600 is configured to store a location identification code for each respective registered user, while feed type field 650 is configured to store the type of data feed (for example, a ten-minute data feed or a next day data feed) assigned to the respective location corresponding to each registered user. For example, registered user John first whose music marker device has marker ID "A11-K21-K43-F23" and whose e-marker.com account user name is "FirstJ" is registered in the San Francisco, Calif., as can be seen from the corresponding entry in location ID field 640 for John First. Moreover, it can be seen from user account database 600 that San Francisco is configured with a 10-minute feed type. On the other hand, user Jack Green located in Vail, Colo., is configured with a next-day feed type data transmission.

As will be discussed in further detail below, depending upon the feed type assigned for each geographic location, playlist provider 150 is configured to transmit information corresponding to broadcast music clips to server terminal 140 for transmission to the users via gateway terminal 130 within the assigned time frame (for example, within 10 minutes of broadcast in geographic location such as San Francisco, Calif., or alternatively, within a predetermined time frame (next-day feed type) for geographic location such as Vail, Colo.

Figure 7:
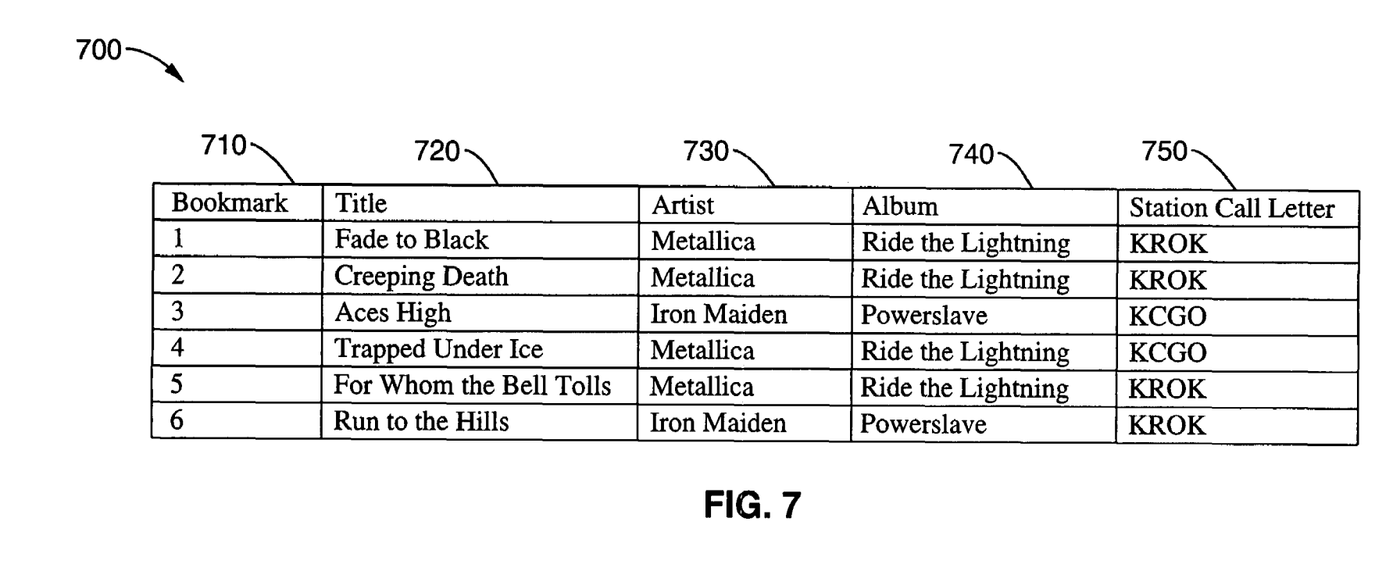
FIG. 7 is a database illustration of user bookmarks stored in the storage unit of the server terminal in accordance with one embodiment.

FIG. 7 is a database illustration of user bookmarks stored in the storage unit of the server terminal in accordance with one embodiment. As discussed above, when the user connects music marker device 110 to gateway terminal 130 via connection 120, a connection with server terminal 140 is established by accessing the user's e-marker.com account via gateway terminal 130. Referring to FIG. 7, as can be seen, user bookmark database 700 corresponds to user Matt Sawyer located in Atlanta, Ga., with marker ID "K01-U-23-N45-I67" who has bookmarked six music clips broadcast over two different radio stations, in particular, radio stations with call letters KROK and KCGO.

In one aspect, user bookmark database 700 for each user may be generated and stored in storage unit 144 of server terminal 140 under the control of controller 145. In particular, when the user connects to server terminal 140 and transmits entered bookmarks and the device ID via gateway terminal 130, controller 145 of server terminal 140 may be configured to access the user account database 600 to retrieve account information corresponding to the user based on the received device ID, and determine the user's location and the type of feed transmission. By comparing the received bookmark date and time stamps with playlist data received from playlist provider 150, and based on the determined location and feed type for the user's bookmarks, controller 140 may be configured to determine the information corresponding to the user's each entered bookmark, such as the name of the bookmarked music clip, the name of the artist, and the name of the album. When controller 145 of server terminal 140 has completed generating user bookmark database 700 based on playlist information received from playlist provider 150 and the bookmarks received from the user, server terminal 140 may be configured to transmit information corresponding to the bookmarked music clips to the user's account for access by the user through gateway terminal 130.

Figure 8:
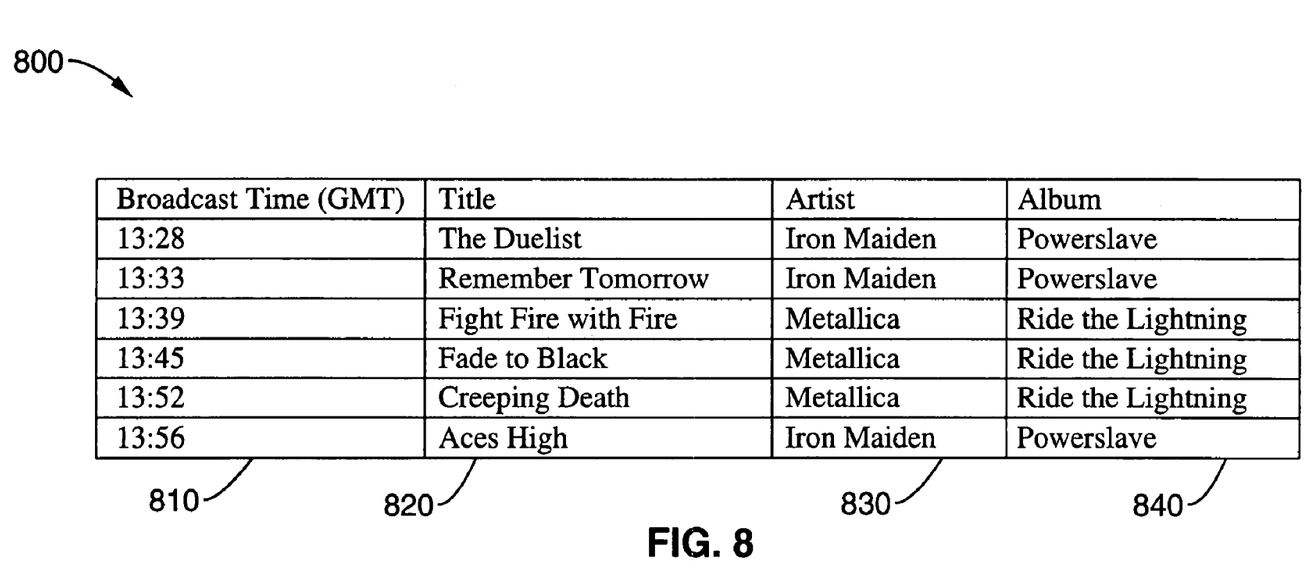
FIGS. 8–9 are database illustrations of broadcast transmissions stored in the storage unit of the playlist provider in accordance with one embodiment.
Figure 9:
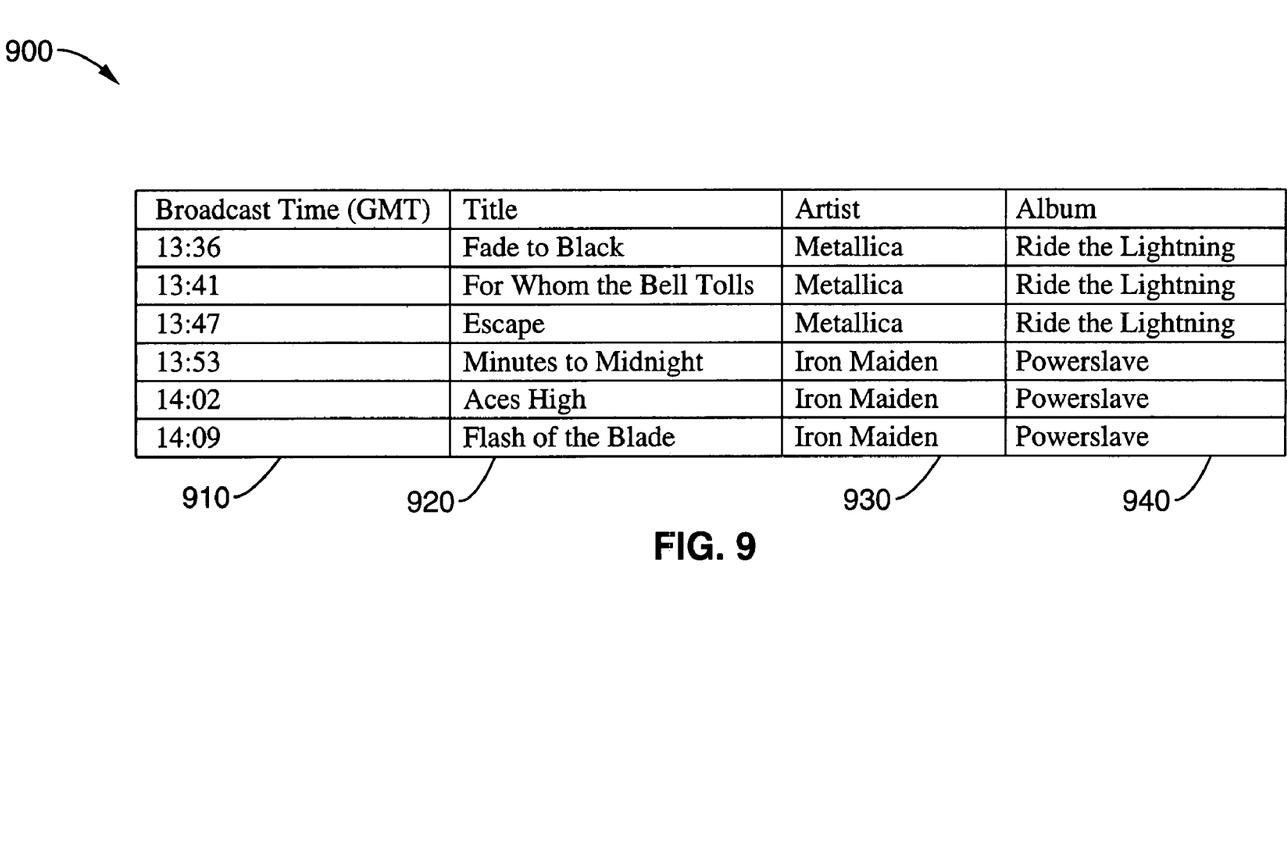

FIGS. 8–9 are database illustrations of broadcast transmissions stored in the storage unit of the playlist provider in accordance with one embodiment. Referring to FIGS. 8–9, broadcast database 800 for radio station KROK in Atlanta, Ga., includes broadcast time field 810, title field 820, artist field 830 and album field 840, and similarly, broadcast database 900 for radio station KCGO in Atlanta includes broadcast time field 910, title field 920, artist field 930 and album field 940. As shown, broadcast time fields 810, 910 are configured to store the beginning time for each broadcast from the respective radio stations, title field 820, 920 are configured to store the title of the music clip broadcast at the corresponding broadcast time, and artist fields 830, 930 and album fields 840, 940 are respectively configured to store the corresponding name of the artist and the album for the broadcast music clip.

Since Atlanta, Ga. is assigned with a 10-minute feed type transmission, after ten minutes from the conclusion of each music clip broadcast from the registered radio stations in Atlanta, for example, radio station with call letter KROK, playlist provider 150 is configured to transmit the information corresponding to the broadcast music clip to server terminal 140 retrieved from 10-minute feed database 151.

For example, user's first bookmark marked on Jan. 21, 2001 at 1:46 PM (FIG. 3) corresponds to broadcast of a song titled "Fade to Black" broadcast from radio station with call letter KROK (FIG. 7) whose broadcast began at 1:45 PM (FIG. 8). It can be seen that the broadcast of the song "Fade to Black" from the radio station with call letter KROK terminated at approximately 1:52 PM. Thus, playlist provider 150 may be configured to retrieve information corresponding to the broadcast song "Fade to Black" such as the name of the artist (Metallica) and the corresponding album (Ride the Lightning) from 10-minute feed database 151 and transmit the retrieved information to server terminal 140 at approximately 1:52 PM. Accordingly, when the user connects music marker device 110 to access the user's e-marker-.com account after bookmarking the various broadcast music clips, the user will obtain information corresponding to the bookmarked music clip received from server terminal 140 at any time after 1:52 PM.

In the case of a geographic location such as Vail, Colo. which is designated with a next-day feed type transmission from playlist provider 150, while similar playlist databases 800, 900 shown in FIGS. 8 and 9 are maintained in next day database 152 of playlist provider 150 for each registered radio station in Vail, Colo., playlist provider 150 is configured to transmit playlist of broadcast music clips to server terminal 140 only at a predetermined time unlike the case where the bookmarked broadcast music clips originated from an area designated as a 10-minute feed type transmission.

In one embodiment, for music broadcasts which began before 10 PM, playlist provider 150 may be configured to transmit the corresponding playlists for each registered radio station broadcasts by 5 AM of the following day to server terminal. On the other hand, as discussed above, for bookmarked music broadcasts in Vail, Colo. after 10 PM, playlist provider 150 may be configured to transmit information corresponding to the broadcast music clips to server terminal 140 after 5 AM or within a predetermined time frame from the actual broadcast, for example, within 24 hours from the actual broadcast, or within a predetermined lapsed time from a given set of broadcast times.

For example, for bookmarked music broadcasts between 10 PM and 2 AM, playlist provider 150 may be configured to transmit data corresponding to the bookmarked broadcast music clips to server terminal 140 by 12 PM (or within ten hours from the cutoff broadcast time of 2 AM), and for bookmarked music broadcasts between 2 AM and 5 AM, playlist provider 150 may be configured to transmit data corresponding to the broadcast music clips to server terminal 140 by 5 PM (or within 12 hours from the cutoff broadcast time of 5 AM).

Figure 10:
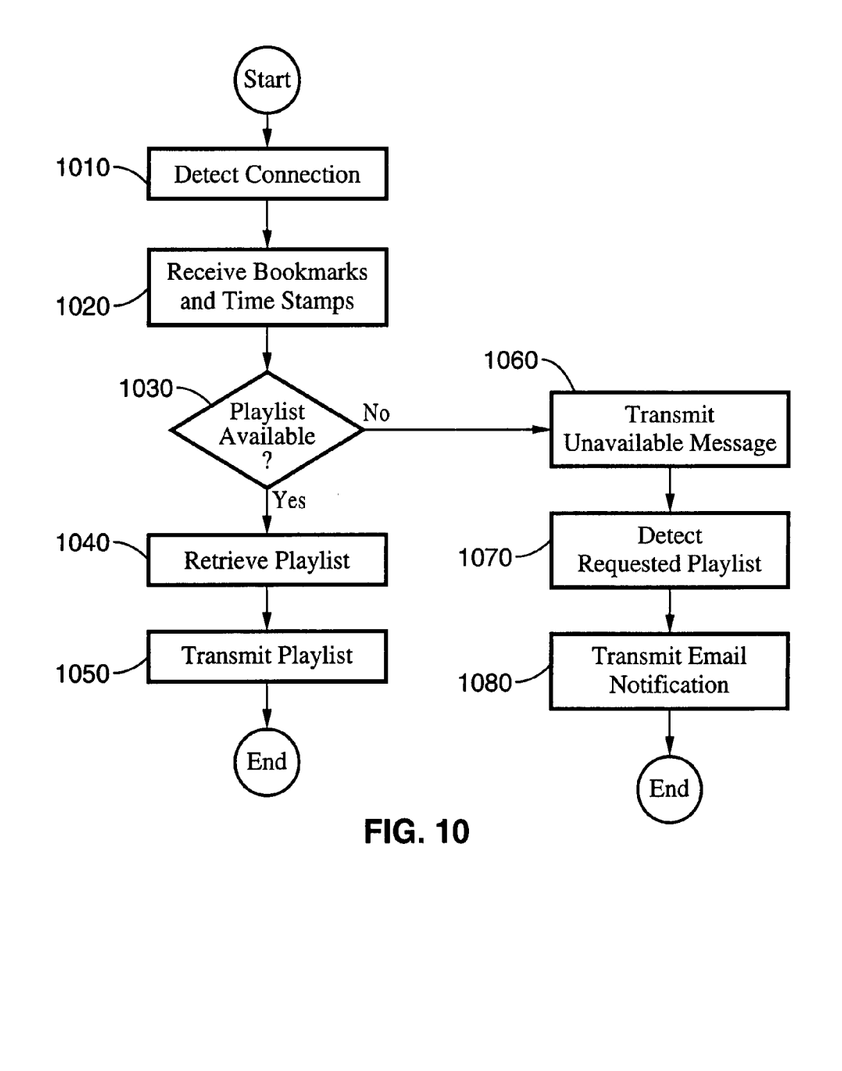
FIG. 10 is a flowchart for illustrating one embodiment of the server terminal procedure for electronic music marker device user playlist notification.

FIG. 10 is a flowchart for illustrating one embodiment of the server terminal procedure for electronic music marker device user playlist notification. Referring to the Figure, at step 1010, gateway terminal 130 connection to server terminal 140 is detected by controller 145 of server terminal 140, and at step 1020 bookmarks from music marker device 110 is received via gateway device 130 I/O interface unit 134 by I/O interface unit 141 of server terminal 140. Then at step 1030, controller 145 queries storage unit 144 to determine whether playlists corresponding to the received bookmarks are available. If it is determined at step 1030 that the playlists corresponding to the received bookmarks are available, then at step 104, the playlists are retrieved from storage unit 144, and at step 1050, server terminal 140 is configured to transmit the retrieved playlists to the user's e-marker.com account accessed from gateway terminal 130. In one embodiment, this is the case for bookmarks generated and received in a geographic location designated for the 10-minute feed type transmission.

On the other hand, if at step 1030 it is determined that the playlists corresponding to the received bookmarks is not available, then at step 1060, server terminal 140 transmits a notification message to the user's e-marker.com account accessed from gateway terminal 130 indicating that the requested information corresponding to the bookmarked music clips are unavailable at the moment, and that the user will be notified when the corresponding playlists become available. The user may at this point optionally log out of the user's e-marker.com account.

At step 1070, controller 145 of server terminal 140 continues to periodically query storage unit 144 to determine whether the playlists for the bookmarked music clips are available, and when controller 145 determines that the corresponding playlists for the user's bookmarked music clips are available, controller 145 in one embodiment is configured to retrieve the user's email address stored in user account database 600 in storage unit 144 and to generate an email notification to the user with a message indicating that the requested information corresponding to the bookmarked music clips is available. Controller 145 in one embodiment may also generate a hypertext link to the user's e-marker-.com account and attach the generated link to the email notification to the user.

Referring back to FIG. 10, at step 1080, server terminal 140 is configured to transmit the generated email notification optionally with the hypertext link to the user's email account. Thereafter, when the user retrieves the email notification (for example, from gateway terminal 130) and clicks on the attached hypertext link, user's browser (or any other program or device which allows the user to communicate with server terminal 140 via gateway terminal 130) is configured to be automatically redirected to the user's e-marker.com account. In one aspect, user's account information may be stored as a cookie file in storage unit 137 of gateway terminal 130. Accordingly, user browser redirect automatically logs the user onto the user's e-marker.com account and the information corresponding to the user's bookmarked music clips are displayed one display unit 132 of gateway terminal 130.

Alternatively, in the case where the user has disabled the use of cookie files in gateway terminal 130, when the user points the browser to the hypertext link received in the email notification, the user may be required to input, via input unit 131 for example, the necessary information to log into the user's e-marker.com account, and upon logging on, the user may view the information corresponding to the bookmarked music clips such as the name oft the music clip, the artist and album for the bookmarked music clip, and optionally, album purchase information such as hypertext links to online vendor web sites and the corresponding listed sale prices.

In the manner described above, depending upon geographic location of bookmarked broadcast music clips, users of music marker devices may access information corresponding to the bookmarked music clips near contemporaneously to the bookmarked music clip broadcasts, or alternatively, within a predetermined time frame from the bookmarked music clip broadcasts. While playlist provider 150 is described with a 10-minute feed database 151 and a next-day feed database 152, within the scope of the present invention, other predetermined feed schedule databases may be used. One example of playlist provider 150 includes Broadcast Data Systems located in Kansas City, Mo. which maintains playlists for approximately 1,100 radio stations throughout the United States. Moreover, 10-minute feed databases in one embodiment may be maintained for substantially densely populated geographic regions including metropolitan areas such as Boston, Mass., Philadelphia, Pa., Washington, D.C., Atlanta, Ga., Chicago, Ill., Seattle, Wash., San Francisco, Los Angeles, and San Diego, Calif., while next-day feed databases may be maintained for substantially less populated areas.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A data marking device notification system, comprising:
a gateway terminal configured to receive one or more data marks including a bookmark from a data marking device of a user;
a playlist provider configured to generate a broadcast playlist including information on at least one music clip;
a server terminal coupled to the gateway terminal configured to receive said one or more data marks including said bookmark from said gateway terminal, said server terminal further configured to search for music clips corresponding to said one or more data marks including said bookmark within said broadcast playlist, if said broadcast playlist is available, from said playlist provider and to generate a user playlist containing said information on said music clips; and means for generating a notification to the user in response to determining that said broadcast playlist has become available.

2. The system of claim 1 wherein said playlist includes one or more of a title of a broadcast music clip, a name of the artist of the music clip and a name of the album of the music clip.

3. The system of claim 1 wherein each of said one or more data marks includes a date stamp and a time stamp.

4. The system of claim 1 wherein said gateway terminal is further configured to receive a data marking device identification code.

5. The system of claim 4 wherein said gateway terminal is further configured to transmit said identification code to said server terminal.

6. The system of claim 5 wherein said server terminal is configured to determine a geographic location code corresponding to said identification code toward selecting which broadcast playlists correspond to a given data mark.

7. The system of claim 6 wherein said server terminal is configured to retrieve a broadcast station call letter corresponding to said geographic location code.

8. The system of claim 7 wherein said server terminal is configured to transmit said broadcast station call letter and said geographic location code to said playlist provider.

9. The system of claim 8 wherein said playlist generated by said playlist provider corresponds to said broadcast station call letter and geographic location code.

10. The system of claim 1 wherein said server terminal is further configured to transmit said user playlist to said gateway terminal.

11. The system of claim 10 wherein said gateway terminal includes a display unit configured to display said received user playlist.

12. The system of claim 11 wherein said gateway terminal display unit includes one of a cathode ray tube, a liquid crystal display unit, and a plasma display unit.

13. The system of claim 1 wherein said server terminal further includes a storage unit for storing said playlist received from said playlist provider, said user playlist and said data marks.

14. The system of claim 1 wherein said server terminal and said gateway terminal are connected via an internet connection.

15. The system of claim 1 wherein said server terminal is configured to generate an email notification for transmission to said gateway terminal.

16. The system of claim 15 wherein said email notification includes a hypertext link attachment corresponding to said user playlist.

17. The system of claim 16 wherein said gateway terminal is configured to display said user playlist when said hypertext link is selected.

18. The system of claim 15 wherein said server terminal automatically generates an email notification when said playlist received from said playlist provider does not correspond to said one or more data marks received from said gateway terminal.

19. The system of claim 18 wherein said server terminal is configured to transmit said email notification to a user email account in said server domain.

20. The system of claim 1 wherein said gateway terminal includes one of a personal computer, an internet access enabled personal digital assistant, Wireless Application Protocol enabled mobile telephone, and an i-mode enabled mobile telephone.

21. A delayed data mark playlist notification system, comprising:
   a gateway terminal connected to a data marking device of a user, said gateway terminal configured to receive one or more data marks including a bookmark from said data marking device, each of said one or more data marks including a time stamp and a date stamp corresponding to a music clip broadcast over a registered radio station as contained within a broadcast playlist;
   a server terminal coupled to said gateway terminal configured to receive said one or more data marks including said bookmark, and accordingly, to generate a corresponding user playlist including one or more of a name of the broadcast music clip, a name of the music clip artist, and the name of the music clip album from a broadcast playlist, if said broadcast playlist is available; and programming in said server terminal for,
   transmitting said generated user playlist, if available, to said gateway terminal,
   sending notification to said gateway terminal, if said broadcast playlist is not available, and
   transmitting a notification to the user when said broadcast playlist becomes available.

22. The system of claim 21 wherein said gateway terminal includes a display unit for displaying said received user playlist.

23. The system of claim 21 wherein said server terminal is further configured to periodically receive broadcast music playlists, said received broadcast music playlists including data corresponding to music clips broadcast over one or more registered radio stations.

24. A data marking device notification system, comprising:
   means for receiving one or more data marks including a bookmark;
   means for generating a broadcast playlist within a storage unit, if playlist of broadcast music clips is currently available;
   means for receiving said broadcast playlist from said storage unit and generating a user playlist of music clip information based on said data marks including said bookmark and said received playlist; and
   means for generating a notification to user in response to determining that said playlist has become available.

25. A delayed data mark playlist notification system, comprising:
   means for receiving one or more data marks including a bookmark input by a user, each of said one or more data marks including a time stamp and a date stamp corresponding to a music clip broadcast over a registered radio station;
   means for generating a user playlist with information on music clips found within a broadcast playlist retained in a storage unit, if the broadcast playlist is currently available, said user playlist including one or more of a name of the broadcast music clip, a name of the music clip artist, and the name of the music clip album; and
   means for generating a notification to the user in response to determining that said playlist has become available.

26. The system of claim 25 further including means for transmitting said generated user playlist.

* * * * *